(12) United States Patent
Hopf et al.

(10) Patent No.: US 6,361,064 B1
(45) Date of Patent: Mar. 26, 2002

(54) INFLATOR SEAL RETAINER FOR AN AIR BAG MODULE

(75) Inventors: Philip Wendel Hopf, Dayton, OH (US); Maria V. Villegas, Chihuahua (MX); Bernd Uwe Zimmerbeutel, Remscheid; William Thomas Shaw, Dusseldorf, both of (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/473,286

(22) Filed: Dec. 28, 1999

(51) Int. Cl.⁷ .............................. B60R 21/16; F16L 37/00
(52) U.S. Cl. ................................. 280/728.1; 280/728.2; 280/732; 280/741; 285/305; 285/321
(58) Field of Search ........................ 280/728.1, 728.2, 280/732, 741; 285/305, 321

(56) References Cited

U.S. PATENT DOCUMENTS

| | | | | |
|---|---|---|---|---|
| 3,076,683 A | * | 2/1963 | Hanley ....................... 308/36.1 |
| 5,022,687 A | * | 6/1991 | Ariga ......................... 285/321 |
| 5,498,025 A | | 3/1996 | Easter et al. |
| 5,527,073 A | * | 6/1996 | Readman .................... 285/340 |
| 5,542,701 A | * | 8/1996 | Rion .......................... 280/735 |
| 5,577,764 A | | 11/1996 | Webber et al. |
| 5,609,354 A | * | 3/1997 | Lauritzen et al. ......... 280/728.2 |
| 5,634,657 A | * | 6/1997 | Rose et al. ............... 280/728.2 |
| 5,692,768 A | * | 12/1997 | Mihm et al. ............. 280/728.2 |
| 5,718,447 A | * | 2/1998 | Rose et al. ............... 280/728.2 |
| 5,732,971 A | * | 3/1998 | Lutz ......................... 280/728.2 |
| 5,810,386 A | * | 9/1998 | Kelley et al. ............ 280/728.2 |

* cited by examiner

*Primary Examiner*—Eric Culbreth
*Assistant Examiner*—Paul Royal, Jr.
(74) *Attorney, Agent, or Firm*—Kathryn A. Marra (57) ABSTRACT

This present invention provides a device for retaining an inflator within an air bag module housing in a sealing manner. In a first embodiment, the device comprises an inflator seal member and an inflator seal retainer. The inflator seal member is disposed about an outer surface of the inflator by disposing the inflator through a central opening formed in the inflator seal member. The inflator seal member further has a flange which is received within a retaining groove formed in the module housing for partially locating the inflator within an internal cavity formed in the module housing. The inflator seal retainer is designed to provide high quality seal retention between the inflator and the module housing. In a broad sense, the inflator seal retainer comprises a symmetric star shaped member having spring-like properties. The inflator seal retainer is formed so that it includes a plurality of peaks radially disposed about an opening defined by the inflator seal retainer. Because the inflator seal retainer has spring-like properties, the inflator is intimately receiving within the opening and makes contact with the retainer at distinct contact points. These contact points comprise points where a retention force is applied by the inflator seal retainer to the inflator to aid in the retention of the inflator. The plurality of peaks are disposed in a plurality of retaining slots formed in the module housing to retain the inflator and provide the desired seal.

14 Claims, 7 Drawing Sheets

INFLATOR SEAL RETAINER FOR AN AIR BAG MODULE

TECHNICAL FIELD

The present invention relates generally to vehicle supplemental inflatable restraint systems and, more particularly, to an inflator seal retainer and inflator seal members for use in air bag modules and a method of retaining the inflator therein.

BACKGROUND OF THE INVENTION

Driver side or passenger side supplemental inflatable restraint (SIR) systems typically include an air bag stored in a housing module within the interior of the vehicle in close proximity to either the driver or one or more passengers. SIR systems are designed to actuate upon sudden deceleration so as to rapidly deploy an air bag to restrain the movement of the driver or passengers. During deployment, gas is emitted rapidly from an inflator into the air bag to expand it to a fully inflated state.

Air bag passive restraint systems include an inflator, which produces gas to inflate the air bag cushion. Known inflators for air bag modules are generally of three types. One type is the pure gas inflator wherein a pressure vessel contains stored pressurized gas. The pressure vessel communicates with the cushion through various types of rupturable outlets or diaphragms. Another type is the gas generator wherein a propellant is ignited and the resultant gas flow through an outlet to the cushion. A third type is the hybrid or augmented type. This type includes a pressure vessel containing stored pressurized gas and a gas generator. When the generator is ignited, the resultant gas flows with the stored gas to the cushion through the pressure vessel outlet.

It is also known to inflate the cushion at a relatively low rate under low level deployment conditions, such as a sudden low level deceleration, and at a relatively high rate under high level deployment conditions, such as a sudden high level deceleration. This can be accomplished in a pure gas type inflator by providing the pressure vessel with an outlet of variable flow area. In addition, devices are known which provide primary inflation (reduced inflation) and full level inflation using a single gas vessel with two separate gas heaters. Primary inflation is accomplished by actuating the gas vessel and heating the gas at a specified reduced level. Full level inflation is accomplished by actuating a second separate heater located at the bottom of the gas vessel to heat the gas at a greater level. This second heater is deployed at the same time or a delayed time as the primary heater to provide full level inflation. It is also known in the art to use a system having two discrete inflators to accomplish dual level inflation. In these types of systems, two discrete inflators are deployed at the same time or at a delayed time depending upon the severity of the sudden deceleration.

The inflator, along with the air bag cushion, is typically disposed within a module housing using molded seals and/or integral retainers to securely retain the inflator therein. However, the use of integral seal and the like adds complexity to both the manufacturing and assembly process and also increases costs and mass. It is desirable to provide an air bag module which utilizes a simple device for providing high quality seal retention of the inflator within the module housing.

SUMMARY OF THE INVENTION

This invention offers advantages and alternatives over the prior art by providing a device for retaining an inflator within an air bag module housing in a sealing manner. In a first embodiment, the device comprises an inflator seal member and an inflator seal retainer. The inflator seal member is disposed about an outer surface of the inflator by disposing the inflator through an opening formed in the inflator seal member. More specifically, the inflator seal member generally comprises a ring-like member having a generally annular inner surface which contacts the outer surface of the inflator. The inner surface preferably includes a plurality of ribs formed thereon to provide a frictional surface for gripping the inflator. The inflator seal member further has a perimetric edge which is received within a retaining groove formed in the module housing for locating and partially retaining the inflator within an internal cavity formed in the module housing.

The inflator seal retainer is designed to provide high quality seal retention between the inflator and the module housing. In a broad sense, the inflator seal retainer comprises a symmetric star shaped member having spring-like properties. In the exemplary and preferred embodiment, the inflator seal retainer is formed of a continuous piece of metal having a cross-section shape of a star. The inflator seal retainer has a first end defining an outwardly bent first prong and a second end defining an outwardly bent second prong. The inflator seal retainer is formed so that it includes a plurality of peaks radially disposed about a central opening defined by the inflator seal retainer. Because the inflator seal retainer has spring-like properties, the first and second prongs may be flexed outwardly to open the inflator seal retainer and permit the inflator to be initially disposed therein or readjusted relative to the inflator seal retainer. Once the first and second prongs are released, they return to their original position by flexing inwardly to thereby make contact with the outer surface of the inflator at distinct contact points. These contact points comprise points where a retention force is applied by the inflator seal retainer to the inflator.

The plurality of peaks of the inflator seal retainer serves to securely attach the inflator seal retainer to the module housing. More specifically, the plurality of peaks are received within a plurality of retaining slots formed in an arcuate wall of the module housing. This results in the inflator seal retainer being locked into place relative to the module housing. The plurality of peaks are elongated to provide enough interference with the plurality of slots so that it is difficult for the inflator seal retainer to come loose from the module housing after the inflator seal retainer is locked into place. Advantageously, the inflator seal retainer comprises a simple device which further positions and retains the inflator within the module housing. The spring-like properties of the inflator seal retainer permit the inflator seal retainer to adapt to variances in inflator diameter and facilitate ease of assembly and disassembly. The simple design provides a means for dismantling the air bag module for material recovery/recycling and provides other benefits mentioned hereinafter.

In a second embodiment, an inflator seal member of a second embodiment is provided and disposed about the outer surface of the inflator by disposing the inflator through a central opening formed in the inflator seal member. More specifically, the inflator seal member generally comprises a ring-like member having an annular inner surface which contacts the outer surface of the inflator. The inner surface preferably includes a plurality of ribs formed thereon to provide a frictional surface for gripping and retaining the inflator. The inflator seal member has a perimetric edge which is received within the retaining groove formed in the module housing for locating and partially retaining the inflator seal member and the inflator within an internal cavity formed in the module housing. An annular outer surface of the inflator seal member includes a plurality of retaining tabs extending therefrom. The plurality of retaining tabs serves to lock the inflator seal member in place in the module housing by insertion of the plurality of retaining tabs into the plurality of retaining slots. Because the inflator is securely disposed within the opening formed in the inflator seal member, the inflator seal member provides a device for sealing the air bag module housing and securing the inflator therein.

In a third embodiment of the present invention, an inflator mounting bracket is provided. The inflator mounting bracket includes a base surface at a closed first end and is open-ended at a second opposing end. The inflator mounting bracket includes a plurality of first arms extending from the base surface and a plurality of second arms extending also from the base surface towards the second end, wherein the first arms have a length less than a length of the second arms. In the exemplary embodiment, there are three first arms, wherein two first arms are disposed about 180° to each other and a third first arm is disposed intermediate the other two and generally 90° from the other two. The second arms are generally disposed so the first arms are disposed between a pair of next adjacent second arms except that one pair of next adjacent second arms does not include a first arm disposed therebetween. Each of the second arms includes a flange at an end opposite the base surface, wherein the flange is designed to be disposed within the retaining groove of the module housing.

The inflator mounting bracket also includes an opening formed in the base surface, wherein the opening receives a stud which preferably extends from one end of the inflator. The opening thus serves to properly position and secure one end of the inflator within the module housing, while the other end of inflator and inflator mounting bracket is positioned and secured within the module housing by inserting the flanges into the retaining slot. Because the plurality of second arms are sufficiently resilient, the second arms may be flexed outwardly apart from one another to permit the inflator to be inserted therebetween and the second arms may also be flexed inwardly to permit the flanges thereof to be aligned with the retaining slot. Once the second arms are released, the second arms flex outwardly causing the flanges to engage the retaining slot. This results in the inflator mounting bracket and the inflator disposed therein to be properly positioned and retained within the module housing.

The devices of the present invention each provide uniform and continuous retention force exerted against the inflator and the module housing which acts to securely position and retain and seal the inflator within the module housing. The simple designs of the devices permit the air bag module to be serviceable and also provides a means for dismantling the air bag module for material recovery/recycling.

The above-described and other features and advantages of the present invention will be appreciated and understood by those skilled in the art from the following detailed description, drawings, and appended claims.

BRIEF DESCRIPTION OF THE DRAWINGS

The present invention will now be described, by way of example only, with reference to the accompanying drawing in which.

DETAILED DESCRIPTION OF THE INVENTION

Figure 1:
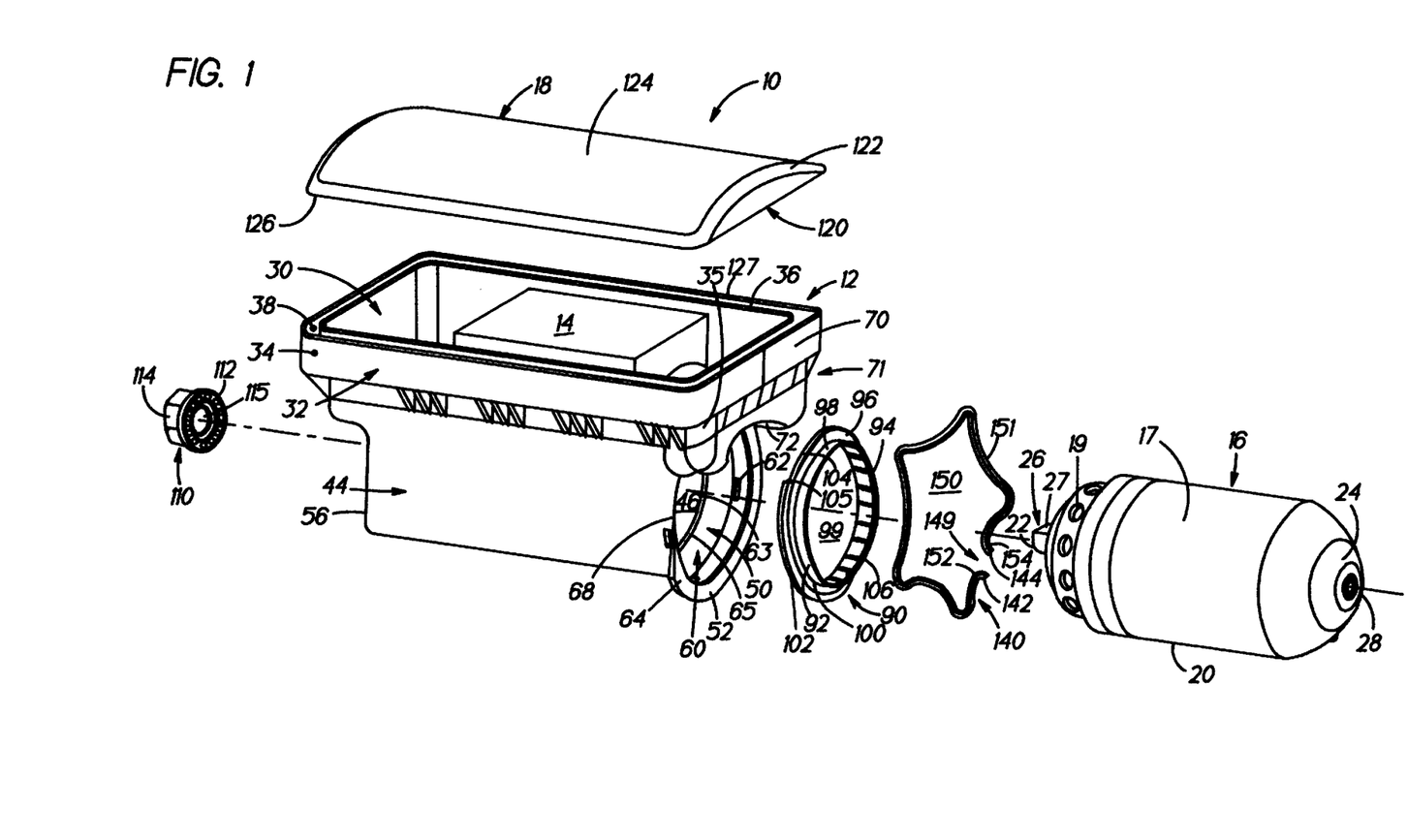
FIG. 1 is an exploded perspective view of an exemplary air bag module including an inflator seal retainer embodying the present invention.

Referring to FIG. 1, an air bag module according to the present invention is generally indicated at 10. Air bag module 10, as illustrated, is particularly suited for use as a passenger side air bag module; however, one skilled in the art will recognize that the present invention described hereinafter may be incorporated into other passive restraint systems, including but not limited to side impact air bag modules and the like. The air bag module 10 generally comprises a module housing 12 in which an air bag cushion 14 (partially shown) and an inflator 16 are disposed therein. A module cover 18 is used to secure the air bag cushion 14 and inflator 16 within the module housing 12 during placement of the air bag module 10 within a vehicle compartment (not shown).

Upon actuation of the inflator 16 in response to fast deceleration of a motor vehicle, heated inflator gas discharges from the inflator 16 through vent ports 19 formed in the inflator 16 to inflate the air bag cushion 14. The inflator 16 releases a predetermined volume of heated gas in response to the sensed deceleration of the vehicle. The output inflation of the inflator 16 is sufficient to fully deploy or inflate the air bag cushion 14.

A controller (not shown), e.g., a sensing and actuating system, generates an ignition signal to the inflator 16 in response to velocity responsive sensors (not shown) mounted on the vehicle bumper and/or acceleration, or inertia responsive sensors mounted on a part of the vehicle occupant compartment, such as the fire wall. In response to the sensed signals, the controller provides an ignition signal to the inflator 16 to initiate deployment inflation of the air bag cushion 14 in accordance with a predetermined level of deceleration. In response to the ignition signal, the inflator 16 releases an appropriate predetermined volume of gas into the air bag cushion 16 through the vent ports 19 of the inflator 16.

As best shown in FIG. 1, the inflator 16 may be of any conventional construction for generating inflator gas to inflate the air bag cushion 14. For example, the inflator 16 may be a single stage inflator which outputs inflator gas at a single level for inflating the air bag cushion 14. The inflator 16 has a generally cylindrical body 20 including a first end 22 and an opposing second end 24. At first end 22, a stud 26 extends therefrom for mounting the inflator 16 within the air bag module housing 12. As best shown in FIG. 1, the stud 26 has a single flat surface 27 along with arcuate surface 29 formed therearound. The opposite end 24 includes an electrical port 28 which permits an electrical connection to be made between the controller and the air bag module 10, more specifically an initiator or pyrotechnic device (not shown) disposed within the inflator 16 for igniting pyrotechnic material which generates the heated inflator gas.

The exemplary air bag module housing 12 includes an internal cavity 30 formed therein for receiving and securing the air bag cushion 14 and the inflator 16. The module housing 12 generally has an upper portion 32 which includes an outer wall 34 and a complementary inner wall 36 spaced inwardly therefrom. Preferably, the outer and inner walls 34, 36, respectively, have the same shape and are merely spaced apart from one another to form a space 38 therebetween. In the exemplary embodiment, the outer and inner walls 34, 36 each have a generally rectangular cross-sectional shape. The outer wall 34 has a beveled section 35 which is angled downwardly and inwardly relative to an upper portion of the outer wall 34 and leads to a lower portion 44. The lower portion 44 is designed to receive the inflator 16 and the air bag cushion 14 is designed to be disposed between the inner wall 36 above the inflator 16 when the inflator 16 is disposed within the air bag module housing 12. It being understood that the internal cavity 30 extends from the upper portion 32 to the lower portion 44. Because the lower portion 44 is sized to receive the inflator 16, the lower portion 44 includes a generally arcuate wall 46. The lower portion 44 has a first opening 50 at a first end 52 thereof and an opposing second opening (not shown) at a second end 56 thereof. Thus, the lower portion 44 is open at each end so that the inflator 16 may be received therein by slidingly disposing the inflator 16 through the first opening 50. The first opening 50 is at least partially defined by an end portion 60 of the arcuate wall 46. End portion 60 includes a plurality of slots 62 formed therein and radially spaced around the first opening 50. In the illustrated embodiment, each of the plurality of slots 62 has a generally rectangular cross section. The end portion 60 also includes a flange 64 which extends outwardly from an outer surface 68 of the end portion 60. The flange 64 preferably does not extend completely around the first opening 50 but rather extends around only a portion thereof. Preferably, the flange 64 is integrally formed as part of the module housing 12.

The end portion 60 of the module housing 12 has a retaining groove 63 formed therein, wherein the retaining groove 63 is defined by a pair of raised rails 65 which extend from an inner surface of the arcuate wall 47. The retaining groove 63 also has a predetermined depth due to the retaining groove 63 being formed in the arcuate wall 46. As illustrated in FIG. 1, the pair of raised rails 65 are preferably parallel to one another and extend around the arcuate wall 47 so that the retaining groove 63 has a generally arcuate shape. The retaining groove 63 is formed proximate the plurality of slots 62 and more specifically is located intermediate the plurality of slots 62 and the second end 56 of the module housing 12. The retaining groove 63 has a width which is defined as a distance between the pair of raised rails 65.

At end 70, the outer wall 34 extends beyond the first end 52 of the lower portion 44 so that an inflator guide section 71 extends downwardly therefrom. The inflator guide section 71 includes an arcuate surface 72 which is intended to guide an upper portion of the inflator 16 into the first opening 50 as the inflator 16 is disposed therein. Once the inflator 16 is disposed within the module housing 12, a gap exists between the arcuate surface 72 and the inflator 16 which permits the inflator 16 to be easily accessed for insertion or removal thereof from the module housing 12. As best shown in FIG. 1, the inflator guide section 71 is integral to the remaining portions of module housing 12.

In the illustrated first embodiment, the air bag module 10 includes an inflator seal member 90 which serves to provide a seal between the inflator 16 and the module housing 12 when the inflator 16 is disposed within the internal cavity 30. In the exemplary and illustrated embodiment, the inflator seal member 90 comprises a generally annular member having an outer surface 92 and an inner surface 94. Inflator seal member 90 includes a first section 96 and a second section 98. The first section 96 comprises a base portion in the form of a first ring and the second section 98 is likewise in the form of a second ring. The second section 98 integrally extends outwardly from the first section 96 so that the inner surface 94 is formed of a portion of the first section 96 and the second section 98. Accordingly, an annular shoulder 100 is formed at the point where the second section 98 extends from the first section 96. An opening 99 is thus defined by the inner surface 94.

A peripheral edge 102 of the first section 96 has a cut-away portion 104 formed around a portion of the circumference of the first section 96. The cut-away portion 104 thus defines an annular peripheral flange 105 which extends around the remaining portion of the circumference of the first section 96. The cut-away portion 104 is designed to engage a complementary section (not shown) of the end portion 60 when the inflator seal member 90 is disposed within the module housing 12. This results in a complete annular seal being provided between the inflator 16 and the module housing 12. The inner surface 94 preferably includes a plurality of ribs 106 which extends radially around the inner surface 94. In the exemplary embodiment, each of the plurality of ribs 106 comprises a rectangular member which longitudinally extends across the inner surface 94. The plurality of ribs 106 further provides a frictional surface which intimately grips the inflator 16 as will be described in greater detail hereinafter.

In an exemplary embodiment, the inflator seal member 90 has a diameter which is complementary to a diameter of the inflator 16 so that the inflator 16 is intimately received within the opening 99. Furthermore, the inflator seal member 90 has a second diameter defined by the peripheral edge 102 which is sized so that the inflator seal member 90 is received and secured within the end portion 60 and more specifically is retained in the retaining groove 63 between the arcuate wall 46. Thus, the inflator seal member 90 also has a width which permits the inflator seal member 90 to be disposed intimately between the pair of raised rails 65. In other words, the inflator seal member 90 is positioned within the module housing by disposing the annular peripheral flange 105 within the retaining groove 63. The peripheral edge 102 has a first width which permits the inflator seal member 90 to have an intimate frictional fit within the retaining groove 63 and more specifically between the pair of raised rails 65 so that the retaining groove 63 not only retains but also locates the inflator seal member 90 during assembly of the air bag module 10.

In the assembly of the air bag module 10, the inflator seal member 90 is disposed about the inflator 16 such that an annular outer surface 17 of the inflator 16 intimately contacts the plurality of ribs 106. Because the plurality of ribs 106 provides a frictional surface, the plurality of ribs 106 helps secondarily to frictionally couple the inflator seal member 90 to the inflator 16. This results because when the inflator seal member 90 is slidingly disposed about the inflator 16, the frictional action of the plurality of raised ribs 106 helps prevent the inflator 16 from freely rotating within the inflator seal member 90. In addition, the complementary design between the inflator seal member 90 and the module housing 12 forms a seal between the inflator 16 and the module housing 12 so that foreign objects and the like are prevented from freely entering the internal cavity 30 of the module housing 12. This results because the cut-away portion 104 of the inflator seal member 90 is aligned with and engages the complementary section of the module housing 12 to form a complete annular seal between the inflator seal member 90/inflator 16 and the module housing 12.

The air bag module 12 also includes an end cap 110 including a base portion 112 and a head section 114 extending therefrom. In the illustrated embodiment, the head section 114 acts as a drive end of the end cap 110. The head section 114 comprises a closed end of the end cap while the base portion 112 is an open end having an opening 115 formed therein and extending therethrough into a portion of the head section 114. In the illustrated embodiment, the head section 114 has a hexagonal shape. The end cap 110 is designed to be disposed about the stud 26 at the first end 22 of the inflator 16 as the air bag module 10 is assembled and the inflator 16 is disposed within the module housing 12. Accordingly, the opening 115 of the end cap 110 has a complementary shape to the stud 26 such that the end cap 110 acts to position and secure the first end 22 of the inflator 16 at the second opening of the module housing 12. Accordingly, end cap 110 serves to seal the module housing 12 at the second end 56 thereof.

The exemplary module cover 18 has a body 120 which has a slightly arcuate upper surface 124 and includes a perimetric rim 126 which extends around body 120. The module cover 18 is designed to be disposed over the module housing 12 so as to enclose the cavity 30. This results in the air bag cushion 14 and the inflator 16 being enclosed within the module housing 12. Accordingly, the size of the module cover 18 and more specifically, the perimetric rim 126 is sized so that the module cover 18 extends over top portions of the inner and outer walls 36, 34, respectively. The module cover 18 may be removably secured to the module housing 12 by any number of suitable techniques known in the art.

Figure 2:
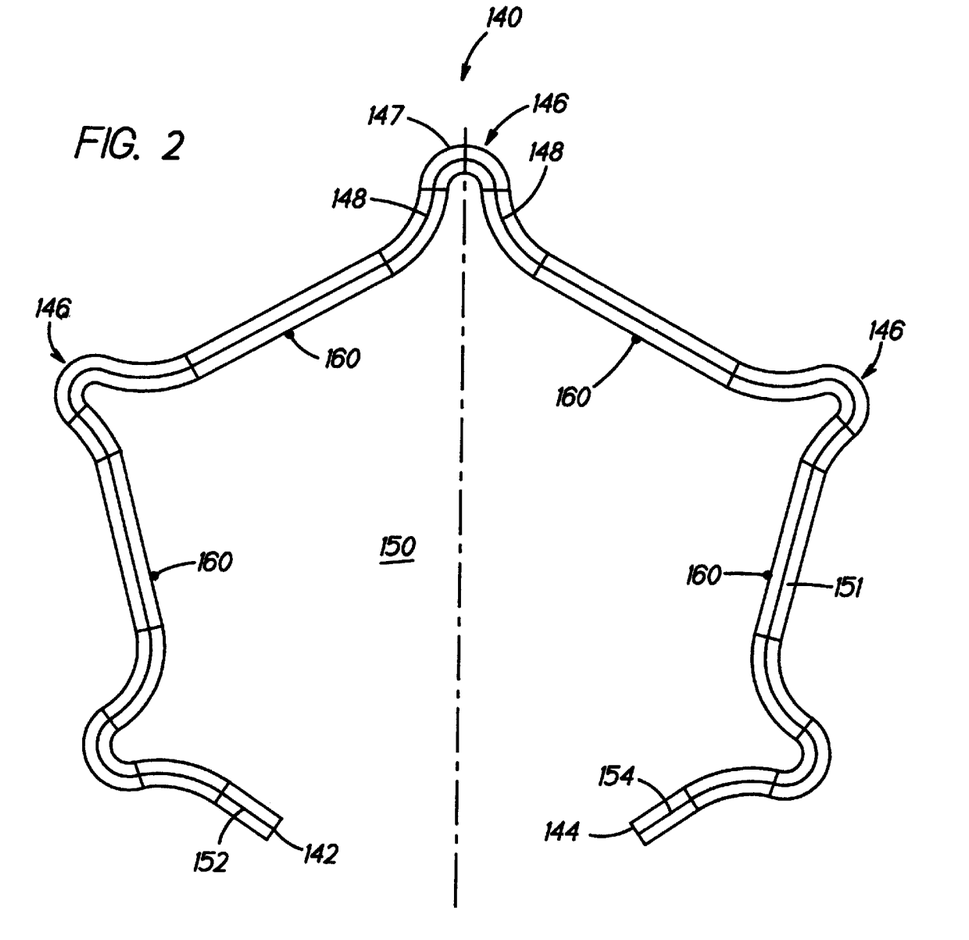
FIG. 2 is a side elevation view of the inflator seal retainer of FIG. 1.

Referring now to FIGS. 1 and 2, an inflator seal retainer 140 according to the present invention provides high quality seal retention between the inflator 16 and the module housing 12. In a broad sense, the inflator seal retainer 140 comprises a symmetric star shaped member having spring-like properties. In the exemplary and illustrated embodiment, the inflator seal retainer 140 is formed of a continuous piece of specific cross-sectional material having the general shape of a star. More specifically, the inflator seal retainer 140 has a first end 142 and an opposing second end 144 which is adjacent next to the first end 142 when the inflator seal retainer 140 is formed. The inflator seal retainer 140 is formed so that it includes a plurality of peaks 146 radially disposed about a central opening 150 defined by the inflator seal retainer 140. Because the inflator seal retainer 140 is formed of a single continuous member, the plurality of peaks 146 each includes a bent portion of the inflator seal retainer 140 where the body of the inflator seal retainer 140 is bent at predetermined points to create the plurality of peaks 146. In the exemplary embodiment, the inflator seal retainer 140 has five (5) complete peaks 146 and one (1) segmented peak 149. Each of the plurality of peaks 146 has an arcuate end segment 147 and a pair of spaced sections 148 which are generally parallel to one another. Between any two next adjacent peaks 146, the inflator seal retainer 140 has a concave section 151 as best shown in the exemplary embodiment of FIG. 1.

The one segmented peak 149 actually comprises the first and second ends 142, 144 of the inflator seal retainer 140. As best shown in FIG. 1, the first and second ends 142, 144 are flared outward so that the inflator seal retainer 140 at each of the first and second ends 142, 144 generally defines a pair of prongs 152, 154. Because the inflator seal retainer 140 has spring-like properties, the pair of prongs 152, 154 serves as a means for either expanding the inflator seal retainer 140 outward by grasping the prongs 152, 154 and directing them away from each other so as to cause the central opening 150 to increase in area. Conversely, the spring-like properties of the inflator seal retainer 140 permit the prongs 152, 154 to be brought together to close the inflator seal retainer 140.

FIG. 2 illustrates the inflator seal retainer 140 in an opened position where the first and second ends 142, 144 are separated from one another so as to open the inflator seal retainer 140 to permit the inflator 16 (FIG. 1) to be disposed therebetween within the central opening 150. The inflator seal retainer 140 contacts the inflator 16 at a plurality of points 160. In the exemplary embodiment, the inflator seal retainer 140 has four contact points 160. These four contact points 160 comprise points where the inflator seal retainer 140 touches the outer surface 17 of the inflator 16 when the inflator seal retainer 140 is disposed therearound by initially opening the inflator seal retainer 140 by directing the prongs 152, 154 away from each other so that the inflator 16 is free to extend through the central opening 150. Once the inflator seal retainer 140 is in a predetermined position relative to the inflator 16, the prongs 152, 154 of the inflator seal retainer 140 are then released permitting the inflator seal retainer 140 to resiliently close and securely hold the inflator 16 therebetween. The four contact points 160 are the points along the inflator seal retainer 140 which intimately contact and clamp the inflator 16 in a tight position.

It will be appreciated that the inflator seal retainer 140 may easily be readjusted along the outer surface 17 of the inflator 16 by simply directing the prongs 152, 154 away from one another thereby releasing the inflator 16 from the clamping action of the inflator seal retainer 140. The inflator seal retainer 140 is then easily repositioned relative to the inflator 16 and once the inflator seal retainer 140 is properly repositioned relative to the inflator 16, the prongs 152, 154 are released and the inflator seal retainer 140 clamps the inflator 16 at the plurality of contact points 160.

It will also be appreciated that according to the present invention, the plurality of peaks 146, 149 serve to securely attach the inflator seal retainer 140 to the module housing 12. More specifically, the plurality of peaks 146 are received within the plurality of slots 62. This results in the inflator seal retainer 140 being locked in place relative to the module housing 12. The plurality of peaks 146 are elongated to provide enough interference with the plurality of slots 62 formed in the module housing 12 so that it is difficult for the inflator seal retainer 140 to come loose from the module housing 12 after the inflator seal retainer 140 is locked into place by insertion of the plurality of peaks 146 into the plurality of slots 62.

The simple yet effective design of the inflator seal retainer 140 provides a retaining device which is easily and conveniently assembled in the module housing 12. The spring-like properties of the inflator seal retainer 140 permit the inflator seal retainer 140 to be used with a number of inflators 16 having varying diameters because the inflator seal retainer 140 is designed to accommodate these inflators 16 by sufficiently opening the inflator seal retainer 140 using the prongs 152, 154 so that the inflator 16 is accommodated. Once the inflator 16 is disposed therebetween, the prongs 152, 154 are released and a clamping action results between the inflator seal retainer 140 and the inflator 16.

The outwardly flared first and second ends 142, 144 are preferably also inserted into one of the slots 62 when the inflator seal retainer 140 is attached to the module housing 12. Because of the resilient nature of the inflator seal retainer 140, the first and second ends 142, 144 may be brought together towards each other to permit the first and second ends 142, 144 to be inserted into one of the slots 62. Once the peaks 146 of the inflator seal retainer 140 are locked into place within the slots 62, the prongs 152, 154 are released and the resiliency of each causes the prongs 152, 154 to flex away from one another and contact walls defining the aperture 62. This serves to lock the segmented peak 149, formed of prongs 152, 154, into place within one of the slots 62 of the module housing 12.

According to the present invention, the inflator seal retainer 140 is preferably made of a metallic material having spring-like properties so that the inflator seal retainer 140 has a resilient nature which permits the prongs 152, 154 to open outwardly from one another and also resiliently flex back towards each other once the prongs 152, 154 are released from the open, extended position. The inflator seal retainer 140 is preferably formed of a material which is either resistant to corrosion or is capable of being coated for corrosion resistance and compatible with injection molded plastics materials. In an exemplary embodiment, the inflator seal retainer 140 comprises a metal wire-like member having the desired corrosion resistance and spring-like properties. Advantageously, the spring-like properties of the inflator seal retainer 140 permit the inflator seal retainer 140 to slightly deform during deployment of the air bag module 10. During the slight deformation, the inflator seal retainer 140 absorbs energy while still maintaining the inflator 16 and the inflator seal member 90 in their proper respective place within the module housing 12 during the deployment of the air bag module 12.

Referring to FIGS. 1 and 2, the spring-like properties of the inflator seal retainer 140 also provide uniform and continuous retention force exerted against the inflator 16 and the module housing 12 which acts to securely position and retain the inflator 16 within the module housing 12 prior to, during, and after the deployment of the air bag module 10. In addition, the inflator seal retainer 140 provides a sufficient projected area to provide retention force for the inflator seal member 90. Furthermore, the design of the inflator seal retainer 140 provides for continuous force to eliminate any rattle which may occur between the inflator 16 and the module housing 12 during assembly of the air bag module 10. The simple design of the inflator seal retainer 140 permits the inflator seal retainer 140 to be serviceable and also provides a means for dismantling the air bag module 10 for material recovery/recycling. It will also be appreciated by one of skill in the art that the inflator seal retainer 140 may be molded as an integral part of the seal to further reduce part count and assembly operations.

Figure 3:
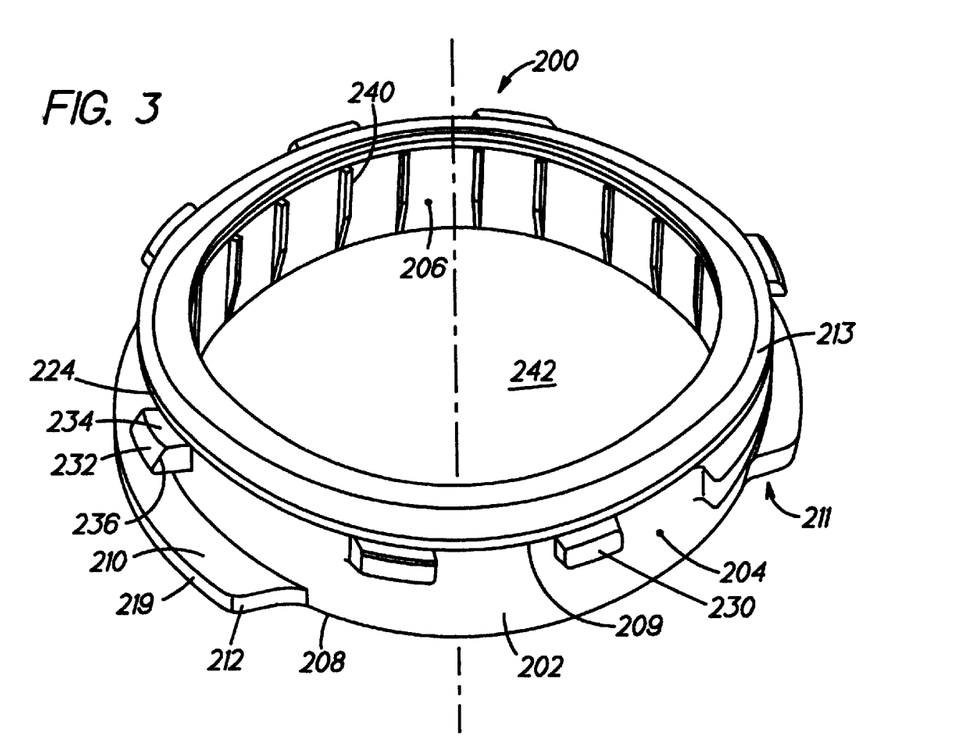
FIG. 3 is a top perspective view of an inflator seal retainer according to a second embodiment of the present invention.
Figure 4:
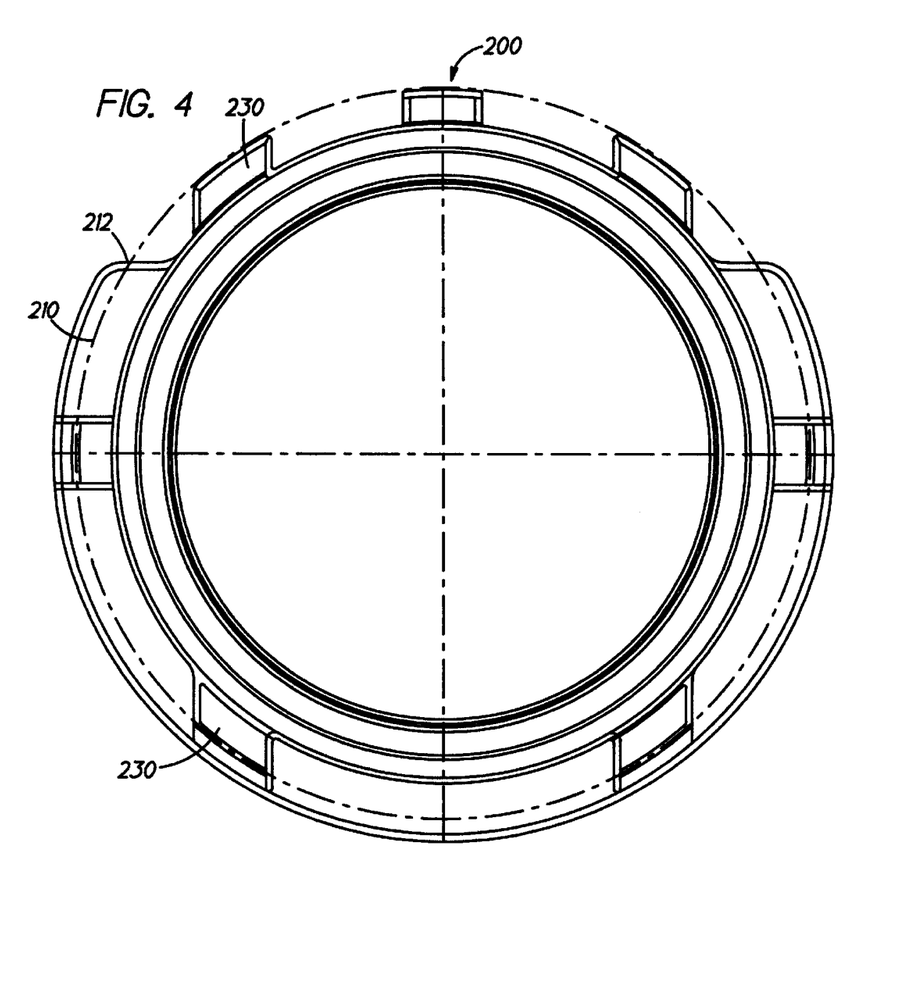
FIG. 4 is a top plan view of the inflator seal retainer of FIG. 3.

Now turning to FIGS. 1 and 3–4 in which a second embodiment of the present invention is illustrated. In the second embodiment, an inflator seal member is provided and generally indicated at 200. It is intended that when the inflator seal member 200 is used, the inflator seal member 90 and the inflator seal retainer 140 shown in FIG. 1 are not used and instead are replaced with the inflator seal member 200. The inflator seal member 200 generally comprises a ring shaped member having a base portion 202 which, as illustrated, comprises an annular wall having an outer surface 204 and an opposing inner surface 206. At a first end 208, the base portion 202 has a flange 210 extending outwardly therefrom. The flange 210 is arcuate in nature; however, it is not in the form of a complete circle as the flange 210 has ends 212, wherein each end 212 comprises a sloped edge extending from the base portion 202 and preferably integral thereto. In other words, the flange 210 has a cut-away portion 211 which is complementary to and designed to mate with a complementary section (not shown) of the end portion 60 of the module housing 12 so that the inflator seal member 200 is disposed and secured in place within the module housing 12, the cut-away portion 211 of the flange 210 engages the complementary section of the module housing 12 so that a complete annular seal is provided. At an opposite second end 209, the base portion 202 includes a perimetric rim 213 which extends outwardly away from the base portion 202 and is preferably annular in nature as best shown in FIGS. 3–4. Accordingly, the inflator seal member 200 has a first diameter defined by an outer edge 219 of the flange 210 and a second diameter defined by an outer edge 224 of the perimetric rim 213, wherein the first diameter is greater than the second diameter.

Referring now to FIGS. 1 and 3–4, the inflator seal member 200 includes a plurality of retaining tabs 230 which extend outwardly away from the outer surface 204 and are formed intermediate the perimetric rim 213 and the first end 208. As illustrated in FIGS. 3–4, some of the plurality of retaining tabs 230 are positioned between the ends 212 of the flange 210. In the exemplary and illustrated embodiment, three (3) retaining tabs 230 are located between the ends 212 of the flange 210. Each of the retaining tabs 230 includes an outer beveled surface 232 in which one edge thereof intersects a first surface 234 of the retaining tabs 230 and another edge intersects a second surface 236 of the retaining tab 230, wherein the first and second surfaces 234, 236 are substantially perpendicular to the outer surface 204. The retaining tabs 230 are designed so as to provide a means for retaining the inflator seal member 200 in the module housing 12. The plurality of retaining tabs 230 are received within the plurality of slots 62 so as to securely attach the inflator seal member 200 within the module housing 12 at the first opening 50.

Similar to the inflator seal member 90, the inflator seal member 200 includes a plurality of ribs 240 formed on the inner surface 206 thereof. The plurality of ribs 240 are formed radially around the inner surface 206 and provide a frictionally engaging surface for gripping and retaining the inflator 16 which is disposed within an opening 242 of the inflator seal member 200. The opening 242 is defined by the inner surface 206. Accordingly, in the assembly of the air bag module 10 when the inflator seal member 200 is used, the inflator 16 is disposed within the opening 242. The plurality of ribs 240 provides a sufficient frictional interference fit between the outer surface 17 of the inflator 16 and the inflator seal member 220 that the inflator seal member 200 is not free to rotate thereabout but rather is securely coupled to the inflator 16. Preferably, the inflator seal member 200 is disposed proximate the second end 24 of the inflator 16.

The flange 210 provides a seal between the arcuate wall 46 of the module housing 12 and the inflator seal member 200 and the plurality of retaining tabs 230 serve to attach the inflator seal member 200 to the module housing 12. The inflator seal member 200 thus provides a useful and effective device for providing a seal between the inflator 16 and the module housing 12. The simple design of the inflator seal member 200 permits the air bag module 10 to be serviceable and also provides a means for dismantling the air bag module 10 for material recovery/recycling.

Figure 5:
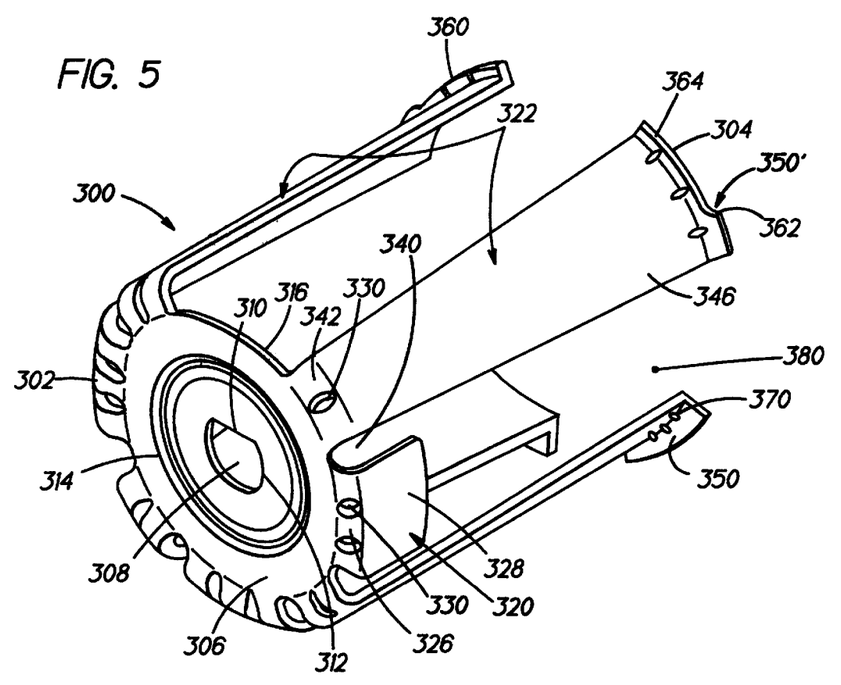
FIG. 5 is a front perspective view of an inflator seal retainer according to another embodiment of the present invention.
Figure 6:
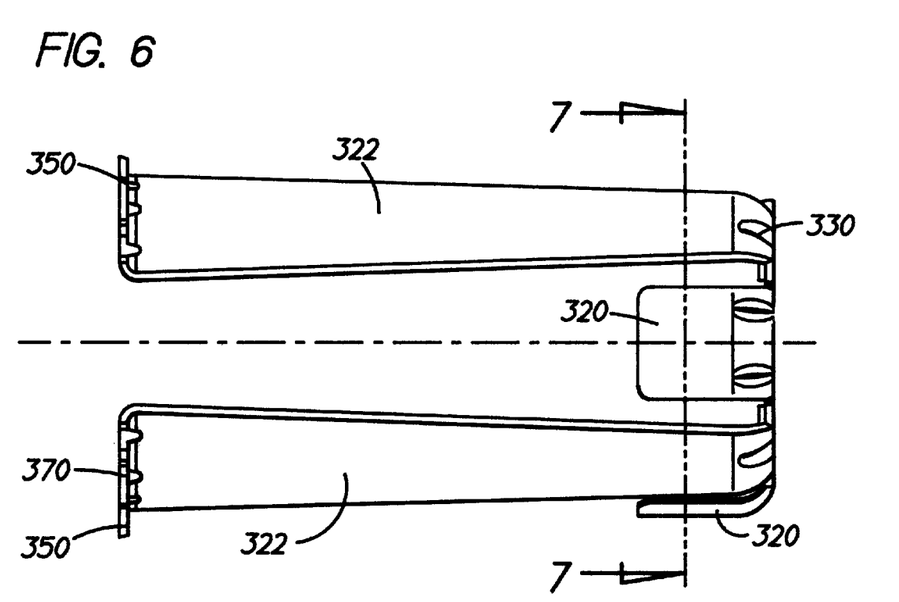
FIG. 6 is a side elevation of the inflator seal retainer of FIG. 5.
Figure 7:
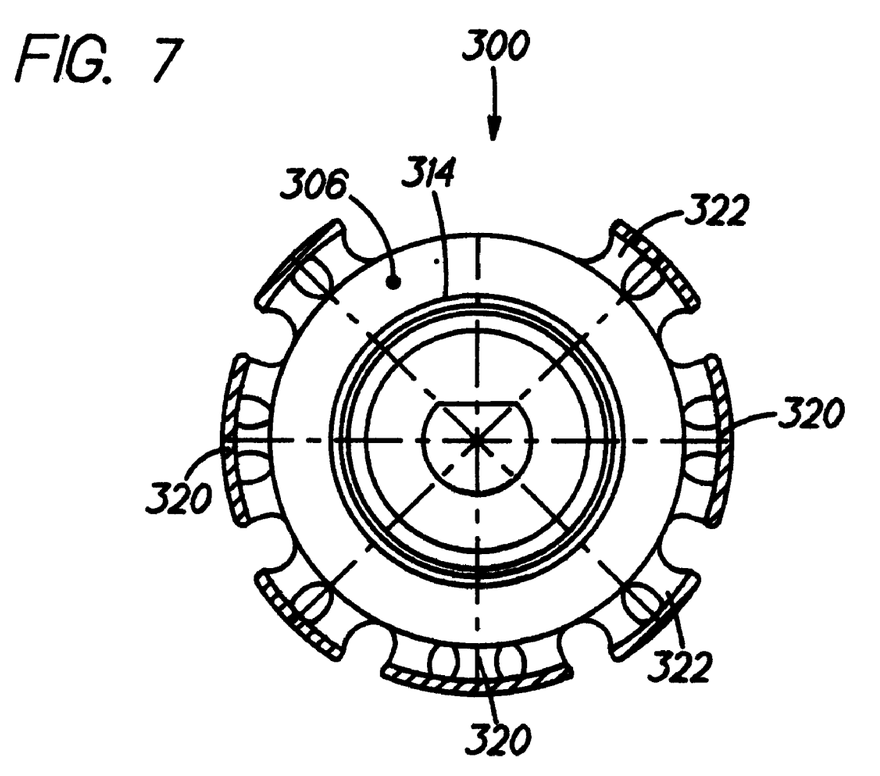
FIG. 7 is cross-sectional view of the inflator seal retainer of FIG. 6 taken along the line 7—7.

Now referring to FIGS. 5–7, in which a third embodiment of the present invention is illustrated. In this embodiment, an inflator mounting bracket is provided an generally indicated at 300. The inflator mounting bracket 300 is designed to take the place of the inflator seal member 90 and the inflator seal retainer 140 illustrated in FIG. 1. FIG. 5 is a front perspective view of the inflator mounting bracket 300. The inflator mounting bracket 300 generally comprises an elongated member having a first end 302 and an opposing second end 304. The first end 302 comprises a generally closed end defined by a base surface 306. The base surface 306 has an opening formed therein and generally indicated at 308. The opening 308 more specifically has a complementary shape as the stud 26 of FIG. 1 so that the stud 26 may extend therethrough during assembly of the air bag module 10 including the inflator mounting bracket 300. The opening 308 thus is defined by a flat edge 310 and an arcuate section 312 which joins the flat edge 310. In the illustrated embodiment, the base surface 306 includes an annular groove 314 disposed about the opening 308. The base surface 306 is generally in the form of a circle including an outer peripheral edge 316.

Referring to FIGS. 1 and 5–7, according to the present invention, the inflator mounting bracket 300 includes a plurality of first arms 320 extending from the base surface 306 at the first end 302 towards the second end 304 and a plurality of second arms 322 extending also from the base surface 306 at the first end 302 towards the second end 304. In the illustrated embodiment, each of the first arms 320 includes a first beveled surface 326 which extends from the outer peripheral edge 316 and a generally planar surface 328 which extends from the first beveled surface 326 towards the second end 304. The generally planar surface 328 has a substantially rectangular shape. The first beveled surface 326 includes at least one vent opening 330 to permit heated inflator gas generated by the inflator 16 to pass therethrough for deploying the air bag cushion 14. As best shown in FIGS. 5–7, the first beveled surface 326 includes a pair of vent openings 330 in the illustrated embodiment. As best shown in FIG. 7, the plurality of first arms 320 are orientated around the base surface 306 at predetermined locations and the illustrated embodiment includes three (3) first arms 320, wherein a pair of first arms 320 are generally 180° from one another and the third first arm 320 is disposed intermediate to the pair of first arms 320 at an angle of about 90° from the other first arms 220. Each first arm 220 is also disposed intermediate to a pair of next adjacent second arms 322 in such a manner that a gap 340 is formed between each of the first arms 320 and each of the second arms 322. In other words, the plurality of first arms 320 and the plurality of second arms 322 are not in contact with one another.

Each of the plurality of second arms 322 includes a second beveled surface 342 which extends from the outer peripheral edge 316 and a generally planar surface 346 which extends from the second beveled surface 342 towards the second end 304. The generally planar surface 346 is tapered outwardly towards the second end 304 so that as first width of the planar surface 346 at the point of intersection with the second beveled surface 342 is less than a second width of the planar surface 346 at the second end 304. In the illustrated embodiment, the second beveled surface 342 includes one vent opening 330 formed therein. Each of the second arms 322 includes a flange 350 formed at the end opposite the second beveled surface 342, wherein the flange 350 thus defines the second end 304 of the inflator mounting bracket 300. The flange 350 is preferably substantially perpendicular to the second arm 322 and is generally rectangular in shape. As previously discussed, the end portion 60 and more specifically the first opening 50 of the module housing 12 has a flange-like portion which is designed to complementarily interfit with a cut-away portion of the inflator sealing and retaining member so that an annular seal results therebetween. Accordingly, a pair of next adjacent second arms 322 have a modified flange 350' which is not rectangular in shape but rather has a cut-away portion 360 defined by a sloped edge 362 leading to an outer edge 364. This cut-away portion 360 is designed to permit the inflator mounting bracket 300 to engage and mate with the complementary flange-like portion of the module housing 12 so that an annular seal results between the inflator mounting bracket 300 and the module housing 12 as will be described in greater detail hereinafter. Furthermore, the next adjacent second arms 322 which include the modified flange 350' do not have a first arm 320 disposed therebetween as shown in FIGS. 5–7. Each of the flanges 350 and 350' preferably includes a plurality of vent ports 370 formed therein.

The length of the plurality of first arms 320 is less than a length of the plurality of second arms 322 so that a slotted opening 380 is formed between next adjacent second arms 322 because each of the first arms 320 does not extend to the second end 304 of the inflator mounting bracket 300, defined by flanges 350, 350'.

The use of inflator mounting bracket 300 and the assembly thereof in air bag module housing 12 will now be described in detail. The inflator mounting bracket 300 has a length which is designed to substantially receive the inflator 16. The first end 22 of the inflator 16 is disposed within the inflator mounting bracket 300 by inserting the first end 22 between the second end 304 of the inflator mounting bracket 300 and directing the stud 26 into the opening 308 formed in the base surface 306. Because of the preferred shape of the opening 308 in the base surface 306, the complementary shape of the stud 26 and the opening 308 serves to locate and properly orient the inflator 16 within the inflator mounting bracket 300. The plurality of first arms 320 also serve to position the first end 22 of the inflator 16 therebetween.

The second end 304 of the inflator mounting bracket 300 is securely attached to the module housing 12 by inserting flanges 350, 350' into the retaining groove 63 formed in the module housing 12. The plurality of second arms 322 are designed to be sufficiently resilient so that the second arms 322 may be flexed apart from each other to insert the first end 22 of the inflator 16 as is disposed therebetween. Due to the resilient nature of the second arms 322, the second arms 322 may be flexed inwardly to permit the second arms 322 to be aligned with the retaining groove 63. The second arms 322 are then released and the resiliency thereof causes the second arms 322 to flex outwardly resulting in the flanges 350, 350' engaging the retaining groove 63. Thus, the flanges 350, 350' serve to securely attach the second end 304 of the inflator mounting bracket 300 within the module housing 12 and because the inflator 16 in intimately secured within the inflator mounting bracket 300 in a frictional manner, the inflator 16 is securely positioned and retained within the module housing 12.

The inflator mounting bracket 300 thus provides a useful and effective device for retaining the inflator 16 within the module housing 12. The simple design and attachment means of the inflator mounting bracket 300 permits the inflator mounting bracket 300 to be easily removed by flexing the plurality of second arms 322 inwardly so as to release the flanges 350, 350' from the retaining groove 63. Once the flanges 350, 350' disengage the retaining groove 63, the inflator mounting bracket 300 may be slidingly removed from the first opening 50 of the module housing 12. It being understood that because the inflator 16 is disposed within the inflator mounting bracket 300, the inflator 16 will likewise be removed from the module housing 12. This permits the air bag module 10, including the inflator mounting bracket 300, to be serviceable and also provides a means for dismantling the air bag module 10 for material recovery/recycling.

According to the present invention, a simpler and more cost effective device for providing a high quality seal retention for known environmental and performance requirements is provided. The device provides uniform and continuous retention force exerted against the inflator 16 and the module housing 12. In addition, the simplicity of the device in all the embodiments of the present invention reduces the complexity of the assembly process while maintaining the desired retention between the inflator 16 and the module housing 12.

It will be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. An inflator seal retainer for retaining an inflator within an air bag module housing including a plurality of retaining slots formed therein, the inflator seal retainer comprising:

a resilient member having an opening, a plurality of retention points, and a plurality of peaks, the inflator being disposable in the opening such that the inflator contacts the plurality of retention points, and such that the plurality of peaks are insertable into the plurality of retaining slots for retaining the inflator within the air bag module housing, the resilient member being configured to provide a first retention force at the plurality of retention points and a second retention force at the plurality of peaks.

2. The inflator seal retainer as set forth in claim 1, wherein the resilient member comprises a continuous body formed of a material having spring-like properties.

3. The inflator seal retainer as set forth in claim 1, wherein the resilient member has a first end and an opposing second end, the first end defining a first prong and the second end defining a second prong, wherein the first and second prongs comprise a segmented peak.

4. The inflator seal retainer as set forth in claim 1, wherein the plurality of retention points comprises points radially located about the resilient member.

5. The inflator seal retainer as set forth in claim 1, wherein the resilient member is formed of a metal wire having the spring-like properties.

6. The inflator seal retainer as set forth in claim 1, wherein each of the plurality of peaks comprises an outwardly bent portion of the resilient member.

7. An air bag module for restraint of an occupant in a vehicle, the air bag module comprising:

a module housing having at least a first opening and a plurality of retaining slots formed therein, the module housing further including a retaining groove formed therein proximate the plurality of retaining slots;

an air bag cushion disposed within the module housing;

an inflator being activatable to discharge inflator gas for inflating the air bag cushion, the inflator being disposed within the module housing;

an inflator seal member having a first opening defined by an inner surface, the inflator seal member having a flange being received within the retaining groove to at least partially retain the inflator within the module housing; and an inflator seal retainer generally in the shape of a star having a second opening being defined by the inflator seal retainer, the inflator seal retainer having a plurality of retention points defined where the inflator disposed within the second opening contacts the inflator seal retainer, the inflator seal retainer providing a first retention force against the inflator at the plurality of retention points, the inflator seal retainer having a plurality of peaks for insertion into the plurality of retaining slots to retain the inflator to the module housing, the inflator seal retainer providing a second retention force at the plurality of peaks.

8. The air bag module as set forth in claim 7, wherein the inflator seal member comprises a ring-like member, the flange extending partially around the circumference of the inflator seal member.

9. The air bag module as set forth in claim 7, wherein the inner surface of the inflator seal member includes a plurality of retaining ribs formed thereon for frictionally gripping the inflator received through the first opening.

10. The air bag module as set forth in claim 7, wherein the inflator seal retainer comprises a continuous body formed of a material having spring-like properties.

11. The air bag module as set forth in claim 7, wherein the inflator seal retainer has a first end and an opposing second end, the first end defining a first prong and the second end defining a second prong, wherein the first and second prongs comprise a segmented peak.

12. The air bag module as set forth in claim 7, wherein the plurality of retention points comprises points radially located about the second opening.

13. The air bag module as set forth in claim 7, wherein the inflator seal retainer is formed of a metal wire having the spring-like properties.

14. The air bag module as set forth in claim 7, wherein each of the plurality of peaks comprises an outwardly bent portion of the inflator seal retainer.

* * * * *